Patented May 10, 1938

2,117,255

UNITED STATES PATENT OFFICE 2,117,255

RESINS AND PROCESS OF MAKING SAME

Remmet Priester, Deventer, Netherlands, assignor to Naamlooze Vennootschap Industrieele Maatschappij Voorheen Noury & Van Der Lande, Deventer, Netherlands, a corporation of the Netherlands No Drawing. Application March 27, 1936, Serial No. 71,317

4 Claims. (Cl. 260—2)

The present invention relates to synthetic resins and the process of making the same. More specifically the invention resides in resins and the process of making the same, which resins are made by reacting resin or resin forming constituents with esters from the type described in the following lines.

Esters may be considered to be composed of compounds containing a carboxyl-(COOH)-group which has reacted with a hydroxyl-(OH)-group of another compound under formation of water according to the general reaction equation:

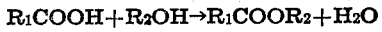

$R_1$ and $R_2$ being the groups bound to the carboxyl- and the hydroxyl-group respectively.

The compounds containing the carboxyl-group from which the esters that are used in the process of the present invention are derived may be saturated or non-saturated fatty acids, resinic acids, naphthenic acids and other monocarboxylic acids, or mixtures of these acids.

The compounds containing the hydroxyl-group from which the esters that are used in the process of the present invention are derived are the esters from long chain fatty acids with mono- or polyhydric alcohols, which long chain fatty acids have at least one hydroxyl group in the chain. Mixtures of these compounds may also be present in the esters.

As illustration may serve the fact that, for example, a simple representative of this group of esters may be obtained if castor oil is heated with a fatty acid such as stearic acid, oleic acid and the like.

Instead of castor oil, hydrogenated castor oil may, for example, also be employed, namely the triglyceride of hydroxystearic acid, of dihydroxystearic acid, etc.

Instead of the glyceride ester, for example, the glycol ester or the ester of a mono alcohol may also be taken.

Instead of stearic acid or oleic acid one may utilize other fatty acids derived from drying-, semi-drying-, and non-drying oils, as linoleic acid and linolenic acid, octadecadienic (9.11) acid (1), elaeostearic acid, lauric acid, myristic acid, palmitic acid or clupanodonic acid. Also resinic acid, for example, the ordinary colophony and naphthenic acids may be used.

Besides one or more of these esters, one or more drying-, semi-drying-, or non-drying oils or the fatty acids derived herefrom may be added and they may jointly be heated with the resin or the resin forming parts.

The oils (respectively) the fatty acids referred to above may be subjected to a pretreatment such as oxidation (for example by blowing), polymerization (bodying), or to a treatment with sulphur, sulphurchloride or chlorine, or to a combination of these treatments.

In order to clearly describe the manner in which my invention may be performed, the following specific examples are set forth, but it is to be distinctly understood, that these specific examples are merely illustrative and are not limiting on the scope of the invention herein described.

Example I 50 parts by weight of castor oil are heated with 50 parts by weight of linseed-oil fatty acids. At a temperature of about 180° C. water is formed, the course of the reaction is gauged by the water liminated or by the acid value of the mixture. At about 230° C. the reaction is completed and 100 parts by weight of colophony and 18 parts by weight of glycerol are added. The reaction temperature is now between 200° and 325° C., after two to three hours a resin is formed with an acid number of 4–10. The resin is soluble in most varnish or lacquer solvents, the film has a high gloss and tenacity.

Example II 50 parts by weight of castor oil are heated with 50 parts by weight of octadecadienic (9.11) acid (1).

After esterification there are added 40 parts by weight of phthalic anhydride and 23 parts by weight of glycerol and the mixture is heated at a temperature between 200° C. and 325° C. for 2–4 hours.

A resin is formed, soluble in most varnish or lacquer solvents. The film is waterproof and has non-yellowing properties, even after baking.

Example III 50 parts by weight of hydrogenated castor oil and 50 parts by weight of soya bean oil fatty acids are esterified as described in Example I, then 40 parts by weight of phthalic anhydride and 23 parts by weight of glycerol are added.

The mass is heated at temperatures between 200° C. and 325° C. for 2 hours until the resin is formed.

This resin has an acid value of 2–4 and can be used as plasticizer in lacquers.

*Example IV*

A modified phenolic resin may be made as follows:

| | Parts |
|---|---|
| Phenol | 100 |
| 35% formaldehyde | 100 |
| Resin | 100 |
| Ester as described in the first sentence of Example II | 100 |
| Glycerol | 18 |

Heat between 200° C. and 325° C. until a homogeneous mass is formed and when cool a modified phenolic resin is obtained.

Instead of using phthalic anhydride I may use other dibasic anhydrides, such as maleic anhydride, succinic anhydride, malic anhydride and the like. Dibasic acids that convert into their anhydride under the circumstances prevailing at the production of resin, i. e. at enhanced temperature, may equally be used and also mixtures of acids and/or acid anhydrides may be employed.

Instead of using glycerol, I may use other polyhydric alcohols, such as glycol.

The resins which are produced herewith are particularly valuable in the manufacture of varnishes, paints, printing inks, lacquers and the like.

I claim:

1. The process of preparing a resinous composition which consists of the following steps (a) esterifying the hydroxy group of castor oil with an acid selected from the group consisting of natural resin acids, naphthenic acids, linoleic acid, linolenic acid, octadecadienic (9.11) acid (1), elaeostearic acid, lauric acid, myristic acid, palmitic acid and clupanodonic acid, and (b) reacting an acid material selected from the class consisting of colophony and phathalic anhydride with glycerol in the presence of the castor oil ester produced in the step (a) hereof.

2. The product produced by the process of claim 1.

3. The process as set forth in claim 1 in which phenol and formaldehyde are co-reacted with colophony and glycerol in the presence of the esterified castor oil produced in step (a) of said claim 1.

4. The product produced by the process of claim 3.

REMMET PRIESTER.